(12) United States Patent
Yamaguchi et al.

(10) Patent No.: US 10,885,375 B2
(45) Date of Patent: Jan. 5, 2021

(54) MOBILE TERMINAL, IMAGE PROCESSING METHOD, AND COMPUTER-READABLE RECORDING MEDIUM

(71) Applicant: PFU Limited, Ishikawa (JP)

(72) Inventors: Naoto Yamaguchi, Ishikawa (JP); Kiyoto Kosaka, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 69 days.

(21) Appl. No.: 16/130,585

(22) Filed: Sep. 13, 2018

(65) Prior Publication Data

US 2019/0012560 A1 Jan. 10, 2019

Related U.S. Application Data

(63) Continuation of application No. PCT/JP2016/058567, filed on Mar. 17, 2016.

(51) Int. Cl.
| | | |
|---|---|---|
| *G06K 9/46* | (2006.01) | |
| *G06K 9/22* | (2006.01) | |
| *H04N 5/232* | (2006.01) | |
| *H04N 1/00* | (2006.01) | |
| *G06K 9/00* | (2006.01) | |

(52) U.S. Cl.
CPC ....... *G06K 9/4609* (2013.01); *G06K 9/00456* (2013.01); *G06K 9/00463* (2013.01); *G06K 9/00483* (2013.01); *G06K 9/22* (2013.01); *G06K 9/4652* (2013.01); *H04N 1/00* (2013.01); *H04N 5/232* (2013.01); *G06K 2209/01* (2013.01)

(58) Field of Classification Search
CPC combination set(s) only.
See application file for complete search history.

(56) References Cited

U.S. PATENT DOCUMENTS

2004/0109067 A1 6/2004 Yokoi
2004/0243602 A1 12/2004 Shiiyama
(Continued)

FOREIGN PATENT DOCUMENTS

| JP | H07-065118 A | 3/1995 |
|---|---|---|
| JP | H09-204492 A | 8/1997 |

(Continued)

OTHER PUBLICATIONS

International Search Report issued in corresponding International Patent Application No. PCT/JP2016/058567, dated Jun. 14, 2016, with English Translation.

(Continued)

*Primary Examiner* — Tsung Yin Tsai
(74) *Attorney, Agent, or Firm* — McDermott Will & Emery LLP

(57) ABSTRACT

A mobile terminal includes a memory, and a processor coupled to the memory, wherein the processor is configured to execute first acquiring a frame obtained through photographing, second acquiring document image data of a document from the frame, first determining whether a form partial feature in a registered form and a document partial feature at a position corresponding to a position of the partial feature match, the document partial feature being in the document, and third acquiring a frame obtained through re-photographing when it is determined that the form partial feature and the document partial feature do not match.

4 Claims, 6 Drawing Sheets

(56) References Cited

U.S. PATENT DOCUMENTS

| | | | |
|---|---|---|---|
| 2006/0262976 A1* | 11/2006 | Hart | G06F 16/583 |
| | | | 382/190 |
| 2008/0112689 A1 | 5/2008 | Yokoi | |
| 2013/0022231 A1* | 1/2013 | Nepomniachtchi | G06K 9/3275 |
| | | | 382/102 |
| 2013/0085935 A1* | 4/2013 | Nepomniachtchi | G06Q 20/14 |
| | | | 705/40 |
| 2013/0120595 A1* | 5/2013 | Roach | G06K 9/38 |
| | | | 348/207.1 |
| 2013/0182002 A1 | 7/2013 | Macciola et al. | |
| 2013/0182128 A1 | 7/2013 | Amtrup et al. | |
| 2013/0182292 A1 | 7/2013 | Thrasher et al. | |
| 2013/0182951 A1* | 7/2013 | Shustorovich | G06F 17/40 |
| | | | 382/167 |
| 2013/0182959 A1 | 7/2013 | Thrasher et al. | |
| 2013/0182970 A1 | 7/2013 | Shustorovich et al. | |
| 2013/0182973 A1 | 7/2013 | Macciola et al. | |
| 2013/0185618 A1 | 7/2013 | Macciola et al. | |
| 2014/0032406 A1* | 1/2014 | Roach | G06Q 20/042 |
| | | | 705/42 |
| 2014/0328520 A1 | 11/2014 | Macciola et al. | |
| 2015/0098628 A1 | 4/2015 | Macciola et al. | |
| 2015/0310270 A1 | 10/2015 | Nomi et al. | |
| 2017/0046788 A1 | 2/2017 | Macciola et al. | |
| 2017/0109830 A1 | 4/2017 | Macciola et al. | |
| 2019/0005323 A1* | 1/2019 | Kimura | G06T 3/0006 |
| 2019/0147238 A1* | 5/2019 | Kanatsu | G06K 9/00449 |
| | | | 382/176 |

FOREIGN PATENT DOCUMENTS

| | | |
|---|---|---|
| JP | H11-288445 A | 10/1999 |
| JP | 2001-325563 A | 11/2001 |
| JP | 2003-216893 A | 7/2003 |
| JP | 2004-164674 A | 6/2004 |
| JP | 2004-201282 A | 7/2004 |
| JP | 2004-355370 A | 12/2004 |
| JP | 2008-310531 A | 12/2008 |
| JP | 2009-087378 A | 4/2009 |
| JP | 2012-098984 A | 5/2012 |
| JP | 2013-105344 A | 5/2013 |
| JP | 2015-503813 A | 2/2015 |
| JP | 2015-210542 A | 11/2015 |

OTHER PUBLICATIONS

Japanese Office Action issued in corresponding Japanese Patent Application No. 2019-157096, dated Oct. 20, 2020, with English translation.

* cited by examiner

MOBILE TERMINAL, IMAGE PROCESSING METHOD, AND COMPUTER-READABLE RECORDING MEDIUM

CROSS-REFERENCE TO RELATED APPLICATION

This application is a continuation of International Application No. PCT/JP2016/058567, filed on Mar. 17, 2016, the entire contents of which are incorporated herein by reference.

FIELD

The present disclosure relates to a mobile terminal, an image processing method, and a computer-readable recording medium.

BACKGROUND

Conventionally, a technique for implementing image matching is disclosed.

A technique is disclosed for matching a plurality of feature points in an input form with a plurality of feature points in a registered form to implement rotation correction.

Also disclosed is a technique for extracting features in a document from a document image matched in size with a registered image to sequentially match the extracted features in the document with features of the registered image matched in size with the document image.

Additionally, disclosed is a technique for determining whether an image of a driver license is processable and outputting, when unprocessable, a message that the image of the driver license is unprocessable.

Furthermore, disclosed is a technique for identifying a type of a document of a digital image by comparing a digital image with a plurality of publicly known document types in one or more publicly known dimensions.

Examples of related-art are described in JP-A-2012-98984, in JP-A-2001-325563, in JP-A-07-65118, and in JP-A-2015-503813.

However, in conventional photographing devices, it takes time for matching, and it is difficult to execute highly-accurate and speedy determining of form types.

SUMMARY

According to an aspect of an embodiment, a mobile terminal includes a memory, and a processor coupled to the memory, wherein the processor is configured to execute first acquiring a frame obtained through photographing, second acquiring document image data of a document from the frame, first determining whether a form partial feature in a registered form and a document partial feature at a position corresponding to a position of the partial feature match, the document partial feature being in the document, and third acquiring a frame obtained through re-photographing when it is determined that the form partial feature and the document partial feature do not match.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

Preferred embodiments of the present disclosure will be explained with reference to accompanying drawings.

Configuration of Present Embodiment

An exemplary configuration of a mobile terminal 100 according to an embodiment of the present disclosure will be explained below with reference to FIG. 1, followed by detailed explanation of processing and the like according to the present embodiment.

Figure 1:
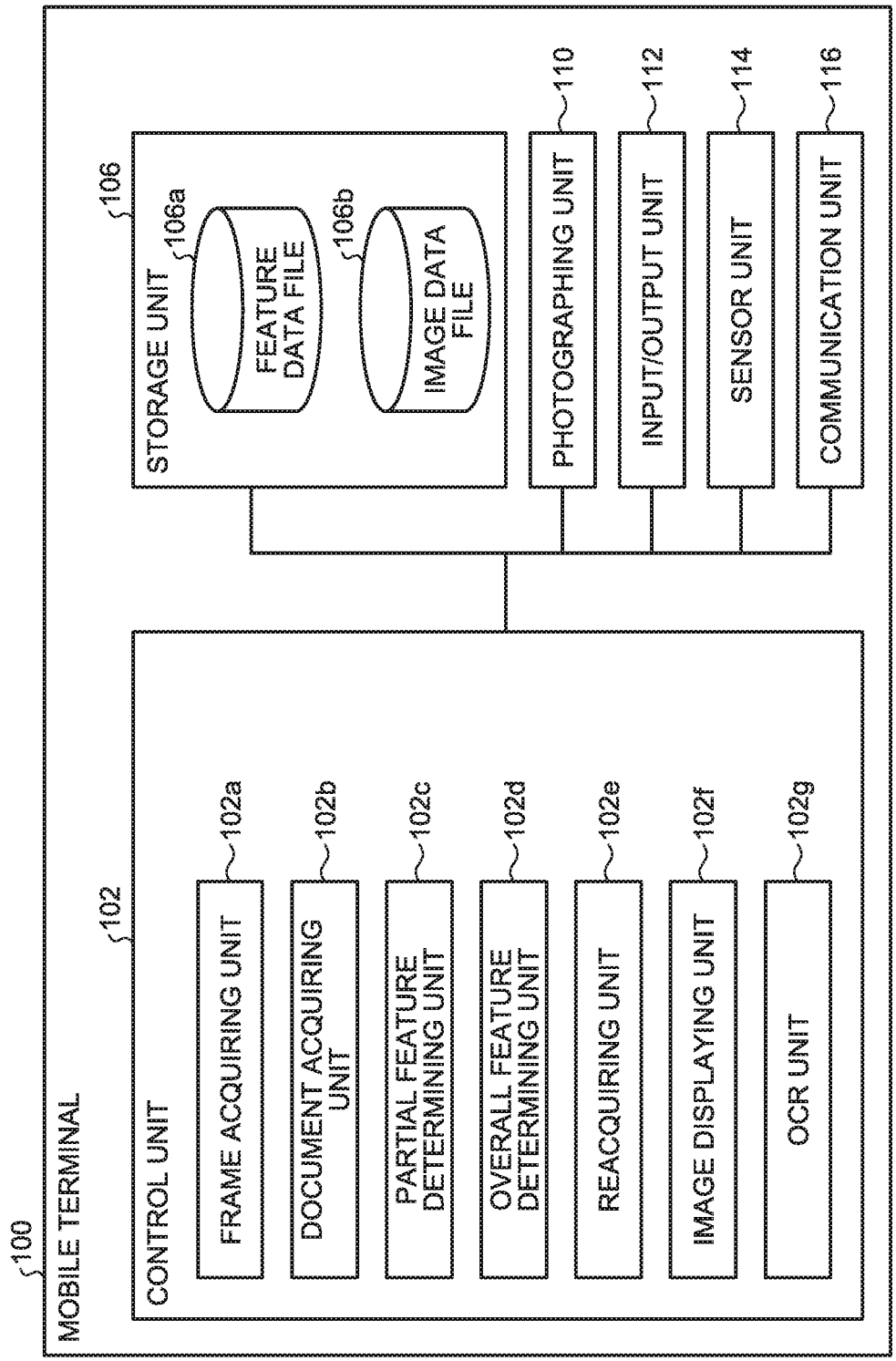
FIG. 1 is a block diagram of an exemplary configuration of a mobile terminal according to the present embodiment.

FIG. 1 is a block diagram of an exemplary configuration of the mobile terminal 100 according to the present embodiment.

However, the embodiment described below exemplifies the mobile terminal 100 for embodying the technical idea of the present disclosure, is not intended to specify the present disclosure to this mobile terminal 100, and can be equally applied to the mobile terminal 100 in other embodiments included in the claims.

In addition, a form of function distribution in the mobile terminal 100 exemplified in the present embodiment is not limited to the following and can be functionally or physically distributed or integrated by the arbitrary unit within a range where similar effects and functions can be achieved.

The mobile terminal 100 may be a mobile information processing device having portability, for example, a tablet terminal, a mobile phone, a smartphone, a personal handy-phone system (PHS), a personal digital assistant (PDA), a laptop personal computer, or a wearable computer of an eyeglass-type, a wristwatch-type, or the like.

As illustrated in FIG. 1, the mobile terminal 100 schematically includes a control unit 102, a storage unit 106, a photographing unit 110, an input/output unit 112, a sensor unit 114, and a communication unit 116.

Although omitted in FIG. 1, in the present embodiment, an input/output interface unit (not illustrated) for connecting the input/output unit 112 and the control unit 102 may be further included. These units of the mobile terminal 100 are communicably connected to one another via an arbitrary communication path.

The communication unit 116 may be a network interface (such as a network interface controller (NIC)) for transmitting and receiving internet protocol (IP) data through any one or both of wired and wireless communications (such as WiFi), Bluetooth (registered trademark), or an interface for wireless communication through infrared communication, or the like.

The mobile terminal 100 may be communicably connected to an external device via a network using the communication unit 116.

The sensor unit 114 detects a physical amount to be converted into a signal (digital signal) of another medium. The sensor unit 114 may include any one, some, or all of a proximity sensor, a direction sensor, a magnetic field sensor, a linear acceleration sensor, a luminance sensor, a gyro sensor, a pressure sensor, a gravity sensor, an acceleration sensor, a barometric pressure sensor, and a temperature sensor.

The input/output unit 112 inputs/outputs (I/O) data. The input/output unit 112 may be, for example, any one, some, or all of a key input unit, a touch panel, a control pad (e.g., a touch pad and a game pad), a mouse, a keyboard, and a microphone.

The input/output unit 112 may also be a displaying unit that displays a display screen of an application or the like (e.g., a display, a monitor, or a touch panel including a liquid crystal, an organic electro luminescence (EL), or the like).

In addition, the input/output unit 112 may be a sound output unit that outputs sound information as a sound (e.g., a speaker). The input/output unit (touch panel) 112 may include the sensor unit 114 that detects physical contact to be converted into a signal (digital signal).

The photographing unit 110 acquires continuous (moving image) image data (frames) by continuous image photographing (moving image photographing) of a subject (e.g., a document). For example, the photographing unit 110 may acquire video data. The photographing unit 110 may also acquire ancillary data.

The photographing unit 110 may include a camera with an image capturing device such as any one or both of a charge coupled device (CCD) and a complementary metal oxide semiconductor (CMOS).

The photographing unit 110 may acquire image data of a still image by still image photographing of a subject. A frame may be uncompressed image data. A frame may also be high-resolution image data.

High resolution may include full Hi-Vision, 4K resolution, or Super Hi-Vision (8K resolution). The photographing unit 110 may photograph moving images at 24 fps, 30 fps, or the like. The photographing unit 110 may be a camera.

The storage unit 106 is storage means and for example, any one, some, or all of a memory such as a random access memory (RAM) or a read only memory (ROM), a fixed disk device such as a hard disk, a solid state drive (SSD), and an optical disk may be used.

The storage unit 106 stores any one, some, or all of various types of databases, tables, buffers, and files (such as a feature data file 106a and an image data file 106b). The storage unit 106 may record computer programs for giving instructions to a central processing unit (CPU) to execute various types of processings, or the like.

Among these components of the storage unit 106, the feature data file 106a stores (registers) feature data on features in a plurality of forms. A feature may include any one or both of a partial feature and an overall feature in a form.

A partial feature may include any one, some, or all of a ruled line, a character, and a characteristic image in a form. A characteristic image may include a pattern image, a character image, a face image, or a background image. An overall feature may indicate a plurality of partial features.

The image data file 106b stores image data (such as frames). The image data file 106b may store any one, some, or all of document image data, area image data of some area in a document, and segmented area image data of a segmented area in a document.

The image data file 106b may also store position data of any one, some, or all of a document, a segmented area, and the like. The image data file 106b may further store character data corresponding to image data.

For example, the image data file 106b may store any one or both of a form type identified from image data and character data on characters described in a form. The image data file 106b may store video data. The image data file 106b may also store ancillary data.

The control unit 102 may include a tangible controller including any one, some, or all of a CPU that integrally controls the mobile terminal 100, a graphics processing unit (GPU), a digital signal processor (DSP), large-scale integration (LSI), an application specific integrated circuit (ASIC), and a field-programming gate array (FPGA).

The control unit 102 has an internal memory for storing a control program, programs that define various types of processing procedures and the like, and required data, and executes, based on these programs, information processing for executing various types of processings.

The control unit 102 functionally and conceptually includes a frame acquiring unit 102a, a document acquiring unit 102b, a partial feature determining unit 102c, an overall feature determining unit 102d, a reacquiring unit 102e, an image displaying unit 102f, and an OCR unit 102g.

The frame acquiring unit 102a acquires image data (frames). The frame acquiring unit 102a may acquire image data obtained through photographing by the photographing unit 110. The frame acquiring unit 102a may also acquire uncompressed and high-resolution image data.

The frame acquiring unit 102a may control continuous image photographing or moving image photographing by the photographing unit 110 to acquire image data (frame) equivalent to one unit. The frame acquiring unit 102a may control still image photographing by the photographing unit 110 to acquire image data. The frame acquiring unit 102a may also acquire ancillary data.

The document acquiring unit 102b acquires document image data of a document. The document acquiring unit 102b may acquire document image data of a document from a frame. The document acquiring unit 102b may acquire area image data of some area in a document from a frame. A document may be a rectangular document.

The document acquiring unit 102b may acquire segmented area image data of a segmented area in a document from a frame. The document acquiring unit 102b may detect position data of a document from a frame. The document acquiring unit 102b may detect corner coordinates (four points) of a document from a frame.

The document acquiring unit 102b may detect a layout of a document from a frame. The document acquiring unit 102b may detect position data of a document from a frame, using any one or both of an edge detection method and a feature point matching method, and acquire document image data based on the position data of the document.

The partial feature determining unit 102c determines whether a partial feature in a registered form in the feature data file 106a and a document partial feature in a document at a position corresponding to a position of the partial feature in the form match.

The partial feature determining unit 102c may determine whether one partial feature in a registered form in the feature data file 106a and a document partial feature in a document at a position corresponding to a position of the partial feature in the form match.

The partial feature determining unit 102c may determine whether a partial feature and a document partial feature match by comparing a matching degree between one partial feature in a registered form in the feature data file 106a and a document partial feature in a document at a position corresponding to a position of the partial feature in the form with a threshold.

The partial feature determining unit 102c may determine whether a partial feature and a document partial feature match by comparing, based on any one, some, or all of a position (coordinates), a color gradation value, the number, and a size of any one, some, or all of ruled lines, characters, and characteristic images included in a partial feature in a registered form in the feature data file 106a, a matching degree between the partial feature and a document partial feature in a document at a position corresponding to a position of the partial feature with a threshold.

A size may include any one, some, or all of a length, a magnitude, an angle, and a width and may be a concept represented by a combination thereof (e.g., a shape).

When a partial feature is a ruled line, the partial feature determining unit 102c may compare a matching degree between a partial feature and a document partial feature with a threshold based on any one, some, or all of a position of intersection coordinates of a ruled line, a color gradation value thereof, the number of ruled lines, and any one, some, or all of a length, a width, and the like of a ruled line.

When a partial feature is a character, the partial feature determining unit 102c may compare a matching degree between a partial feature and a document partial feature with a threshold based on any one, some, or all of a position of a character, a color gradation value thereof, the number of characters, and any one, some, or all of a magnitude, a length, a width, and the like of a character area.

When a partial feature is a characteristic image (e.g., a pattern image), the partial feature determining unit 102c may compare a matching degree between a partial feature and a document partial feature with a threshold based on any one, some, or all of a position of a characteristic image, a color gradation value thereof, the number of characteristic images, and any one, some, or all of a magnitude, a length, a width, a shape, and the like of a characteristic image.

The overall feature determining unit 102d determines whether an overall feature in a registered form in the feature data file 106a and a document overall feature in a document match.

When the partial feature determining unit 102c determines that a partial feature and a document partial feature match, the overall feature determining unit 102d may determine whether an overall feature in a registered form in the feature data file 106a and a document overall feature in a document match.

When the partial feature determining unit 102c determines that a partial feature and a document partial feature match, the overall feature determining unit 102d may determine whether a plurality of partial features in a registered form in the feature data file 106a and a document partial feature in a document at a position corresponding to a position of each of the partial features in the form match.

The reacquiring unit 102e acquires a frame used for feature determining or image data (frames) obtained through re-photographing by the photographing unit 110. The reacquiring unit 102e may further have pseudo shutter operation information output.

When the partial feature determining unit 102c determines that a partial feature and a document partial feature do not match, the reacquiring unit 102e may acquire a frame obtained through re-photographing by the photographing unit 110.

When the overall feature determining unit 102d determines that an overall feature and a document overall feature do not match, the reacquiring unit 102e may acquire a frame obtained through re-photographing by the photographing unit 110.

When the overall feature determining unit 102d determines that a plurality of partial features and a document partial feature do not match, the reacquiring unit 102e may acquire a frame obtained through re-photographing by the photographing unit 110.

When the partial feature determining unit 102c determines that one partial feature in all registered forms in the feature data file 106a and a document partial feature in a document at a position corresponding to a position of the partial feature in the forms do not match, the reacquiring unit 102e may acquire a frame obtained through re-photographing by the photographing unit 110.

When the partial feature determining unit 102c determines that a partial feature and a document partial feature match, the reacquiring unit 102e may acquire a frame used for feature determining or a frame obtained through re-photographing by the photographing unit 110 and have, in doing so, pseudo shutter operation information output.

When a form identified through feature determining is a small form, for example, a driver license or a business card, the reacquiring unit 102e may directly acquire a frame used for feature determining.

Meanwhile, when a form identified through feature determining is, for example, a form of A-4 size requiring a high resolution, the reacquiring unit 102e may acquire a new high-resolution and uncompressed frame obtained through re-photographing by the photographing unit 110.

The reacquiring unit 102e may control photographing (such as continuous image photographing, moving image photographing, or still image photographing) by the photographing unit 110 to acquire a new frame. Furthermore, the reacquiring unit 102e may store an acquired frame in the image data file 106b.

The image displaying unit 102f has image data displayed. The image displaying unit 102f may have any one or both of a frame and document image data displayed.

The image displaying unit 102f may also have the input/output unit 112 display image data. The image displaying unit 102f may have character data displayed.

The OCR unit 102g subjects image data to OCR processing to acquire character data. The OCR unit 102g may subject document image data or a frame to OCR processing to acquire character data. Furthermore, the OCR unit 102g may store acquired character data in the image data file 106b.

Processing in Present Embodiment

As an example of form feature determining processing executed by the mobile terminal 100 with the configuration will be explained below with reference to FIGS. 2 to 7.

Form Feature Determining Processing (Part 1)

Figure 2:
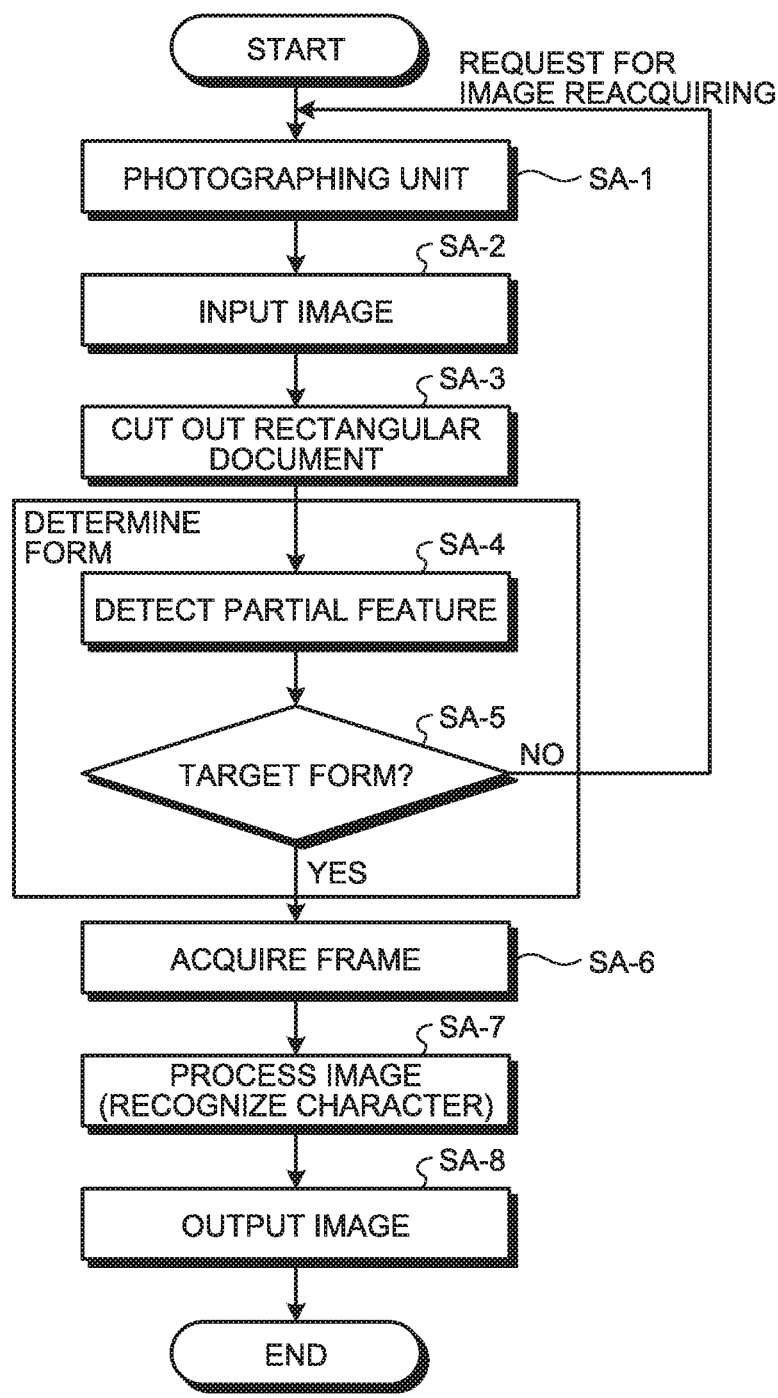
FIG. 2 is a flowchart of exemplary processing in the mobile terminal according to the present embodiment.

An example of form feature determining processing when there is one type of registered form according to the present embodiment will be explained below with reference to FIGS. 2 and 3. FIG. 2 is a flowchart of exemplary processing in the mobile terminal 100 according to the present embodiment.

As illustrated in FIG. 2, the frame acquiring unit 102a activates the photographing unit (camera) 110 and controls continuous image photographing or moving image photographing by the photographing unit 110 (Step SA-1).

The frame acquiring unit 102a inputs (acquires) a frame of an image captured by the camera 110 (Step SA-2).

The document acquiring unit 102b cuts out, using any one or both of the edge detection method and the feature point matching method, document image data of a rectangular document from a frame acquired by the frame acquiring unit 102a (Step SA-3).

The partial feature determining unit 102c detects a document partial feature in a document at a position corresponding to a position of one partial feature in a registered form in the feature data file 106a (Step SA-4).

In the feature data file 106a, position information and feature information (such as a ruled line, a character image, a text, a pattern image, and a face image) may be pre-registered for each form. A color may be a gradation value such as red-green-blue (RGB), hue-saturation-value (HSV), Lab, or YUV.

In other words, in the present embodiment, unique features and area information may be pre-registered as form data.

The partial feature determining unit 102c determines whether a partial feature and a document partial feature match (a rectangular document is a target form) by comparing a matching degree between one partial feature in a registered form in the feature data file 106a and a detected document partial feature with a threshold (Step SA-5).

Thus, in the present embodiment, a feature in cutout image data is detected to determine consistency with a feature in a form pre-registered in the feature data file 106a.

In the present embodiment, in determining consistency, it may be determined whether a position of intersection coordinates, a color gradation value, the number of ruled lines, a length or a width of a ruled line, the number of characters, or the like satisfies a threshold, or whether images match.

This means that, in the present embodiment, a partial feature may be determined based on any one, some, or all of a position (such as coordinates) of a partial feature, a color thereof, the number of partial features, and a size (any one, some, or all of a length, a magnitude, a width, etc.) of a partial feature.

When determining that a rectangular document is not a target form (Step SA-5: No), the partial feature determining unit 102c requests for image reacquiring and shifts the processing to Step SA-1.

On the other hand, when determining that a rectangular document is a target form (Step SA-5: Yes), the partial feature determining unit 102c shifts the processing to Step SA-6.

In other words, in the present embodiment, when consistency with a registered form is obtained, consistent form type information may be set to shift the processing to image processing (such as an OCR analysis) in a subsequent stage.

The reacquiring unit 102e acquires a frame used for feature determining or controls photographing by the camera 110 to acquire a new high-resolution and uncompressed frame to store in the image data file 106b and has, in doing so, the input/output unit 112 output pseudo shutter operation information (Step SA-6).

This means that, in the present embodiment, when determined to be an intended form, a pseudo shutter may be automatically released to acquire image data.

The OCR unit 102g subjects document image data included in a frame acquired by the reacquiring unit 102e or a frame to character recognition through image processing (OCR processing) to acquire character data (Step SA-7).

The image displaying unit 102f has the input/output unit 112 output (display) a form name of a form identified through feature determining, character data acquired by the OCR unit 102g, and document image data included in a frame acquired by the reacquiring unit 102e (Step SA-8) and ends the processing.

Here, an example of screen displaying according to the present embodiment will be explained with reference to FIG. 3. FIG. 3 is a view of exemplary screen displaying according to the present embodiment.

Figure 3:
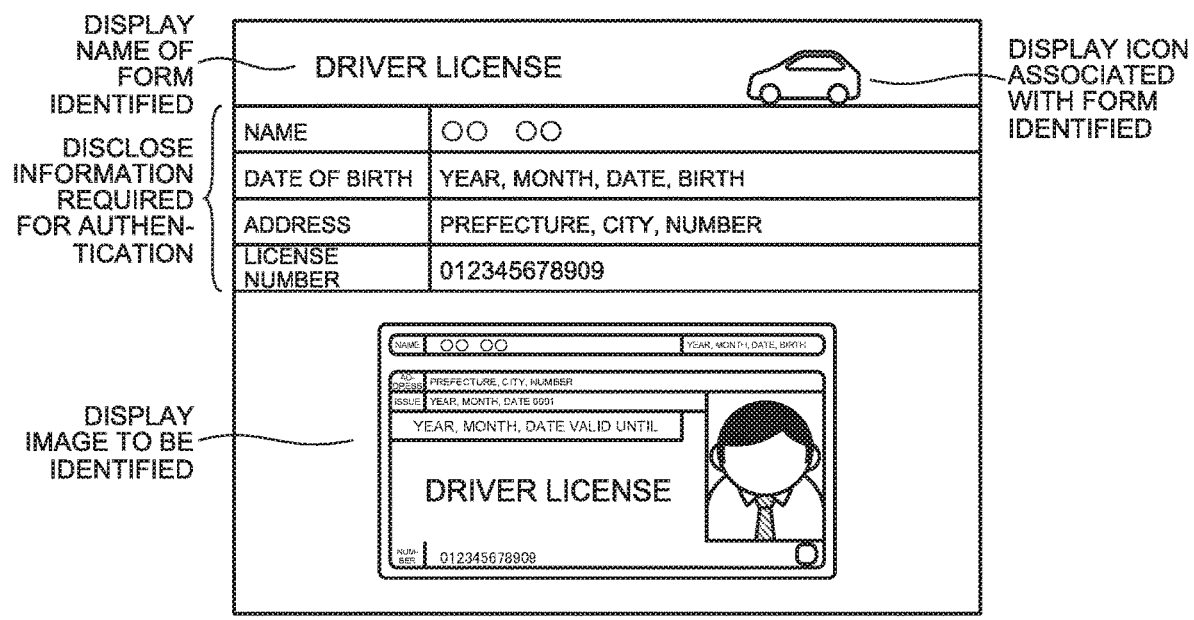
FIG. 3 is a view of exemplary screen displaying according to the present embodiment.

As illustrated in FIG. 3, in the present embodiment, a form name (driver license) of a form identified through feature determining and an icon of the form, information of characters described in a form (any one, some, or all of name, date of birth, address, expiration date, license number, etc.), and document image data may be displayed by the input/output unit (display) 112.

In the present embodiment, data processing desired by a user can be realized by turning over read information (transmitting data) to a service (system) or the like depending on a form by user operation on a displayed screen or the like.

Thus, in the present embodiment, speedy retry processing is realized by executing partial feature determining.

Form Feature Determining Processing (Part 2)

Figure 4:
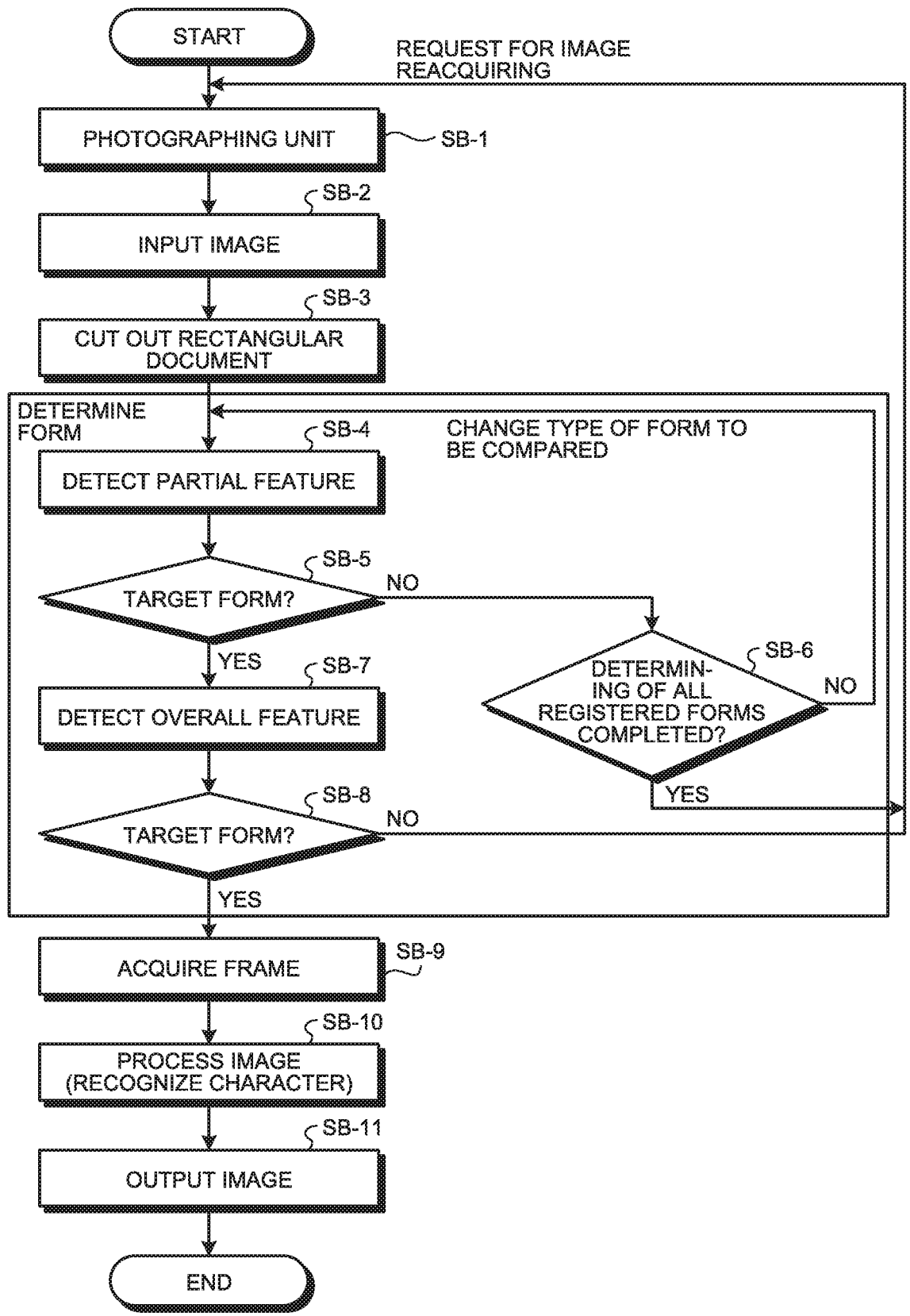
FIG. 4 is a flowchart of exemplary processing in the mobile terminal according to the present embodiment.

Next, an example of form feature determining processing when there is a plurality of types of registered forms according to the present embodiment will be explained with reference to FIGS. 4 to 6. FIG. 4 is a flowchart of exemplary processing in the mobile terminal 100 according to the present embodiment.

As illustrated in FIG. 4, the frame acquiring unit 102a activates the photographing unit (camera) 110 and controls continuous image photographing or moving image photographing by the photographing unit 110 (Step SB-1).

The frame acquiring unit 102a inputs (acquires) a frame of an image captured by the camera 110 (Step SB-2).

The document acquiring unit 102b cuts out, using any one or both of the edge detection method and the feature point matching method, document image data of a rectangular document from a frame acquired by the frame acquiring unit 102a (Step SB-3).

The partial feature determining unit 102c detects a document partial feature in a document at a position corresponding to a position of one partial feature in a registered form in the feature data file 106a (Step SB-4).

The partial feature determining unit 102c determines whether a partial feature and a document partial feature match (a rectangular document is a target form) by comparing a matching degree between one partial feature in a registered form in the feature data file 106a and a detected document partial feature with a threshold (Step SB-5).

Thus, in the present embodiment, a feature amount in a form is detected and determined, which makes it possible to identify even equal-sized forms with high accuracy.

When determining that a rectangular document is not a target form (Step SB-5: No), the partial feature determining unit 102c shifts the processing to Step SB-6.

The partial feature determining unit 102c determines whether the determining whether one partial feature in all registered forms in the feature data file 106a and a detected document partial feature match is completed (Step SB-6).

When determining that the determining whether one partial feature in all registered forms and a detected document partial feature match is completed (Step SB-6: Yes), the partial feature determining unit 102c requests for image reacquiring and shifts the processing to Step SB-1.

On the other hand, when determining that the determining whether one partial feature in all registered forms and a detected document partial feature match is not completed (Step SB-6: No), the partial feature determining unit 102c changes the type of a form to be compared, registered in the feature data file 106a to shift the processing to Step SB-4.

Here, an example of partial feature determining according to the present embodiment will be explained with reference to FIG. 5. FIG. 5 is a view of exemplary partial feature determining according to the present embodiment.

Figure 5:
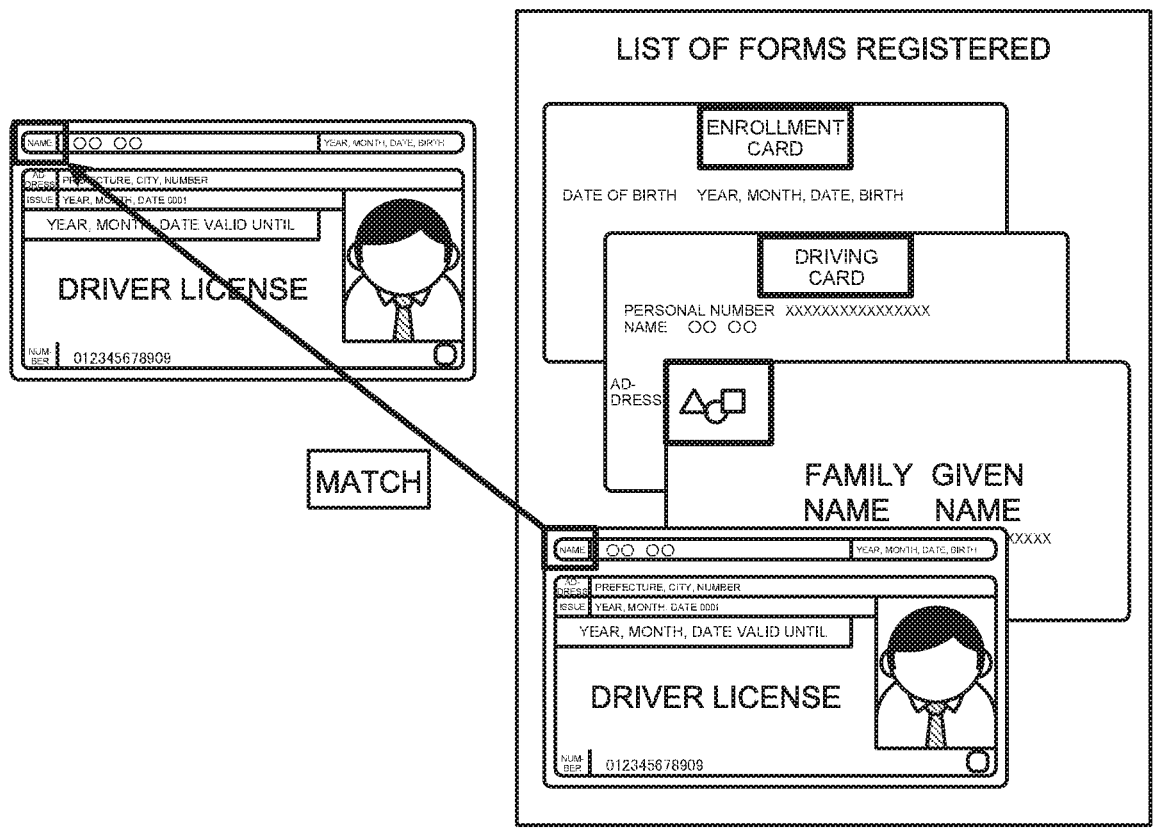
FIG. 5 is a view of exemplary partial feature determining according to the present embodiment.

As illustrated in FIG. 5, in the present embodiment, consistency between cutout document image data and a partial feature in a form pre-registered in the feature data file 106a may be determined.

Thus, in the present embodiment, consistency determining is intended for partial feature determining, which allows for speedy determining even for a plurality of registered forms and speedy retry processing even when an error occurs.

Referring back to FIG. 4, when determining that a rectangular document is a target form (Step SB-5: Yes), the partial feature determining unit 102c shifts the processing to Step SB-7. In short, in the present embodiment, once consistency with a registered form is obtained, the processing is shifted to overall feature detecting.

The overall feature determining unit 102d detects a document overall feature in a document (e.g., a document partial feature in a document at a position corresponding to a position of a plurality of partial features in a registered form in the feature data file 106a) (Step SB-7).

The overall feature determining unit 102d determines whether an overall feature in a registered form in the feature data file 106a and determined to be a target form by the partial feature determining unit 102c and a document overall feature in a document match (a rectangular document is a target form) (Step SB-8).

Here, an example of overall feature determining according to the present embodiment will be explained with reference to FIG. 6. FIG. 6 is a view of exemplary overall feature determining according to the present embodiment.

In the present embodiment, in overall feature determining, an overall feature of an entire image and an overall feature in a registered form may be compared. As with partial feature determining, the comparison may be executed based on feature data registered in the feature data file 106a.

Figure 6:
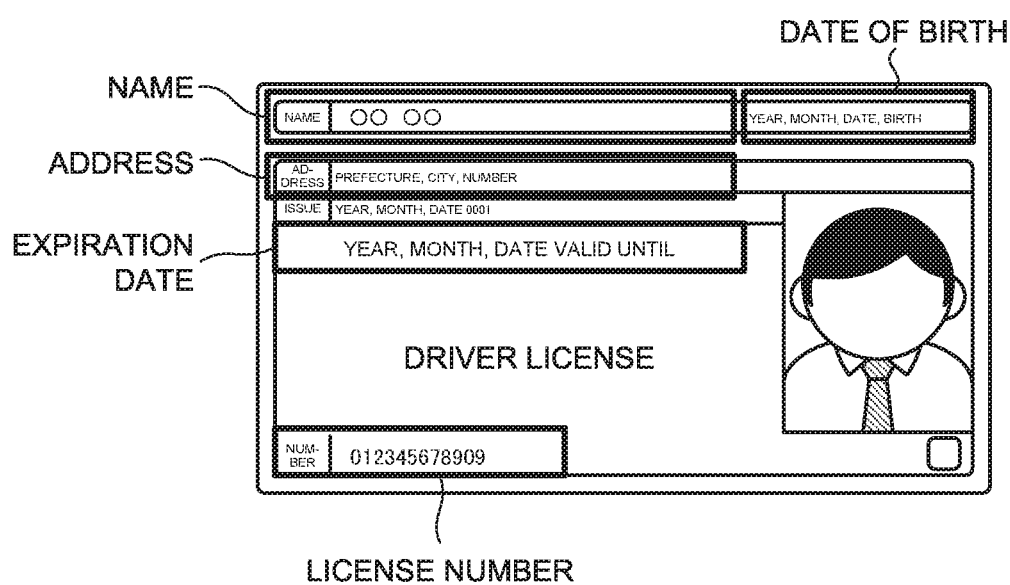
FIG. 6 is a view of exemplary overall feature determining according to the present embodiment.

As illustrated in FIG. 6, for example, in the present embodiment, in the case of a driver license, layout determining may be executed for name, date of birth, address, expiration date, license number, and the like.

Referring back to FIG. 4, when determining that a rectangular document is not a target form (Step SB-8: No), the overall feature determining unit 102d requests for image reacquiring and shifts the processing to Step SB-1.

In other words, in the present embodiment, when consistency with a partial feature in a part of a specific form is obtained in partial feature determining, but consistency is not obtained in overall feature determining, image data acquiring (re-photographing) in the first sequence is repeated.

On the other hand, when determining that a rectangular document is a target form (Step SB-8: Yes), the overall feature determining unit 102d shifts the processing to Step SB-9.

In short, in the present embodiment, when consistency is obtained in overall feature determining, consistent form type information is set to shift the processing to image processing (such as an OCR analysis). The overall feature determining unit 102d may acquire information necessary for image processing for each form type.

The reacquiring unit 102e acquires a frame used for feature determining or controls photographing by the camera 110 to acquire a new high-resolution and uncompressed frame to be stored in the image data file 106b and has, in doing so, the input/output unit 112 output pseudo shutter operation information (Step SB-9).

The OCR unit 102g subjects document image data included in a frame acquired by the reacquiring unit 102e or a frame to character recognition through image processing (OCR processing) to acquire character data (Step SB-10).

The image displaying unit 102f has the input/output unit 112 output (display) a form name identified through feature determining, character data acquired by the OCR unit 102g, and document image data included in a frame acquired by the reacquiring unit 102e (Step SB-11) and ends the processing.

Thus, in the present embodiment, feature determining in two stages allows for accurate and speedy form identification.

Form Feature Determining Processing (Part 3)

Figure 7:
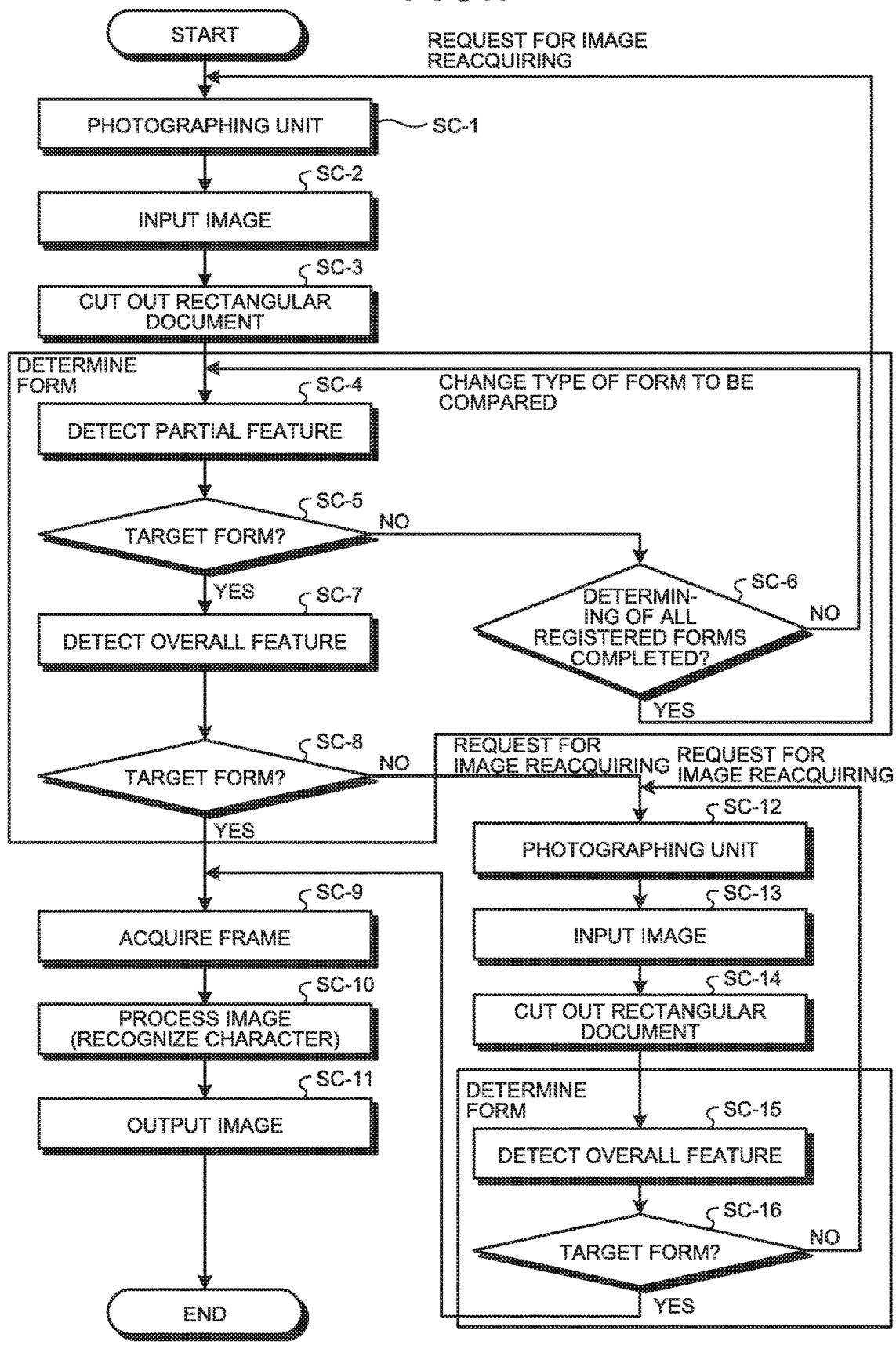
FIG. 7 is a flowchart of exemplary processing in the mobile terminal according to the present embodiment.

An example of form feature determining processing when there is a plurality of types of registered forms according to the present embodiment will be explained below with reference to FIG. 7. FIG. 7 is a flowchart of exemplary processing in the mobile terminal 100 according to the present embodiment.

Processings in Steps SC-1 to SC-7 illustrated in FIG. 7 are identical to those in Steps SB-1 to SB-7 illustrated in FIG. 4, and therefore explanations will be omitted.

The overall feature determining unit 102d determines whether an overall feature in a registered form in the feature data file 106a and determined to be a target form by the partial feature determining unit 102c and a document overall feature in a document match (a rectangular document is a target form) (Step SC-8).

When determining that a rectangular document is a target form (Step SC-8: Yes), the overall feature determining unit 102d shifts the processing to Step SC-9.

Processings in Steps SC-9 to SC-11 illustrated in FIG. 7 are identical to those in Steps SB-9 to SB-11 illustrated in FIG. 4, and therefore explanations will be omitted.

On the other hand, when determining that a rectangular document is not a target form (Step SC-8: No), the overall feature determining unit 102d requests for image reacquiring and shifts the processing to Step SC-12.

The reacquiring unit 102e activates the photographing unit (camera) 110 and controls continuous image photographing or moving image photographing by the photographing unit 110 (Step SC-12).

The reacquiring unit 102e inputs (acquires) a frame of an image captured by the camera 110 (Step SC-13).

The document acquiring unit 102b cuts out, using any one or both of the edge detection method and the feature point matching method, document image data of a rectangular document from a frame acquired by the frame acquiring unit 102a (Step SC-14).

Then, the overall feature determining unit 102d detects a document overall feature in a document (Step SC-15).

Then, the overall feature determining unit 102d determines whether an overall feature in a registered form in the feature data file 106a and determined to be a target form by the partial feature determining unit 102c and a document overall feature in a document match (a rectangular document is a target form) (Step SC-16).

When determining that a rectangular document is not a target form (Step SC-16: No), the overall feature determining unit 102d requests for image reacquiring and shifts the processing to Step SC-12.

On the other hand, when determining that a rectangular document is a target form (Step SC-16: Yes), the overall feature determining unit 102d shifts the processing to Step SC-9.

Thus, in the present embodiment, once a medium to be photographed is clear in partial feature determining, processing for partial feature determining may be bypassed at and after the second time of processing.

This makes it possible, in the present embodiment, to shorten the time for processing for partial feature determining from the second time and execute speedier retry processing.

Thus, in the present embodiment, it is possible to cut out a rectangular document area from one frame of high-resolution image data extracted from moving image data by a camera, detect a feature in the cutout document area, determine a form type, and restart, when a match is not found, from acquiring image data.

In the present embodiment, a two-stage feature determining may be executed for speedy and highly-accurate determining. In the first stage, a comparison with a feature in a specific area set for each form may be executed.

A specific area and a feature set for each form may be unique for each form type. In the second stage, a comparison of a feature of an entire form may be executed. This allows for, in the present embodiment, speedy processing and highly-accurate form identification.

In recent years, with the spread of mobile terminals such as smartphones or tablets, the demand for document scanning with a camera included in a mobile terminal is increasing. This is because a mobile terminal is easy to use and has, unlike conventional scanners, the advantage that a dedicated terminal is not required.

Conventionally, there is a mechanism for automatically photographing a document using a mobile terminal, and in personal authentication using a mobile terminal camera, it is necessary to photograph a document intended for personal authentication.

However, conventionally, an unnecessary document or an image unrecognizable through OCR is photographed.

Thus, in the present embodiment, a method is proposed for determining whether a document being photographed with a camera is an intended document and automatically photographing when determined to be a document recognizable through OCR.

Other Embodiments

Although an embodiment of the present disclosure has been explained above, the present disclosure may be implemented in various different embodiments, besides the embodiment, within the scope of the technical idea provided in the claims.

For example, the mobile terminal 100 may execute processing in a stand-alone form or may execute processing in response to a request from a client terminal (a separate housing from the mobile terminal 100) to return the processing results to the client terminal.

Of the processings explained in the embodiment, all or a part thereof explained as those assumed to be executed automatically can be executed manually, or all or a part thereof explained as those assumed to be executed manually can be executed automatically by a publicly known method.

Besides, processing procedures, control procedures, specific names, information including parameters such as registration data or search conditions of each processing, screen examples, or database configurations can be arbitrarily changed unless otherwise specified.

With respect to the mobile terminal 100, each component illustrated in the drawings is functionally conceptual and is not necessarily required to be physically configured as illustrated.

For example, in terms of processing functions that each device in the mobile terminal 100 has, particularly each processing function executed in the control unit 102, all or an arbitrary part thereof may be realized by a CPU and a program interpreted and executed in the CPU or may be realized as hardware by Wired Logic.

A program is recorded on a non-transitory computer-readable recording medium, described later, including a programmed instruction for causing a computer to execute a method according to the present disclosure and read mechanically by the mobile terminal 100 as necessary. In other words, in the storage unit 106 such as an ROM or a hard disk drive (HDD), a computer program for giving instructions to a CPU in cooperation with an operating system (OS) to execute various types of processings is recorded. This computer program is executed by being loaded into RAM and is included in a control unit in cooperation with a CPU.

This computer program may be stored in an application program server connected to the mobile terminal 100 via an arbitrary network, and all or a part of the computer program can be downloaded as necessary.

The program according to the present disclosure may be stored in a computer-readable recording medium or may be configured as a program product. This "recording medium" includes an arbitrary "physical medium for transportable uses" such as a memory card, a universal serial bus (USB) memory, a secure digital (SD) card, a flexible disk, a magneto optical disk (MO), an ROM, an erasable programmable read only memory (EPROM), an electric erasable programmable read only memory (EEPROM), a compact disc read only memory (CD-ROM), a digital versatile disc (DVD), and a Blu-ray (registered trademark) Disc.

A "program" is a data processing method described in an arbitrary language or by an arbitrary description method, regardless of the form such as a source code or a binary code. A "program" is not necessarily limited to one configured alone and includes one distributedly configured as a plurality of modules or libraries, or one that achieves one's own function in cooperation with a separate program represented by an OS. Well-known configurations and procedures can be used for a specific configuration for reading a recording medium, reading procedures, installation procedures after reading, or the like at each device indicated in the embodiments.

Various types of databases and the like stored in the storage unit 106 are storage means including any one, some, or all of a memory device such as an RAM or an ROM, a fixed disk device such as a hard disk, a flexible disk, and an optical disk and may store any one, some, or all of various types of programs, tables, databases, webpage files, and the like used for various types of processings and website provision.

The mobile terminal 100 may be configured as an information processing device such as a known personal computer or may be configured to connect an arbitrary peripheral device to the information processing device. The mobile terminal 100 may be realized by mounting, in the information processing device, software (including programs and data) for realizing a method according to the present disclosure.

Furthermore, specific forms of device distribution or integration are not limited to those illustrated in the drawings, and all or a part thereof may be functionally or physically distributed or integrated by the arbitrary unit according to various types of additions or the like, or according to functional loads. In other words, the embodiments may be implemented in arbitrary combination or selectively implemented.

According to the present disclosure, an intended form is automatically determined from among captured images, and an image is acquired when a quality thereof is recognizable through optical character recognition (OCR), or the like. Therefore, once photographing is started, an intended document can be photographed without time and effort of a user.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile terminal comprising:
a memory; and
a processor coupled to the memory, wherein
the processor executes:
first acquiring a frame obtained through photographing;
second acquiring document image data of a document from the frame;
first determining whether a form partial feature in a registered form and a document partial feature at a position corresponding to a position of the form partial feature match, the document partial feature being in the document;
after the first determining, second determining whether a form overall feature in the registered form and a document overall feature in the document match when it is determined that the form partial feature and the document partial feature match in the first determining; and
third acquiring a frame obtained through re-photographing when it is determined that the form partial feature and the document partial feature do not match in the first determining, or, when it is determined that the form overall feature and the document overall feature do not match in the second determining.

2. The mobile terminal according to claim 1, wherein
the form partial feature is a feature of some of a plurality of items in the registered form, and
the form overall feature is a feature of a layout of the plurality of items in the registered form.

3. An image processing method comprising:
first acquiring a frame obtained through photographing;
second acquiring document image data of a document from the frame;
first determining whether a form partial feature in a registered form and a document partial feature at a position corresponding to a position of the form partial feature match, the document partial feature being in the document;
after the first determining, second determining whether a form overall feature in the registered form and a document overall feature in the document match when it is determined that the form partial feature and the document partial feature match in the first determining; and
third acquiring a frame obtained through re-photographing when it is determined that the form partial feature and the document partial feature do not match in the first determining, or, when it is determined that the form overall feature and the document overall feature do not match in the second determining.

4. The image processing method according to claim 3, wherein
the form partial feature is a feature of some of a plurality of items in the registered form, and
the form overall feature is a feature of a layout of the plurality of items in the registered form.

* * * * *